United States Patent
Mevissen et al.

(10) Patent No.: US 7,954,613 B2
(45) Date of Patent: *Jun. 7, 2011

(54) DECOUPLER ASSEMBLY

(75) Inventors: Bert Mevissen, Nobleton (CA); James W. Dell, Newmarket (CA); John R. Antchak, Aurora (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,160

(22) Filed: Oct. 20, 2009

(65) Prior Publication Data

US 2010/0032258 A1 Feb. 11, 2010

Related U.S. Application Data

(63) Continuation of application No. 10/572,128, filed as application No. PCT/CA2004/001696 on Sep. 22, 2004, now Pat. No. 7,624,852.

(60) Provisional application No. 60/504,934, filed on Sep. 22, 2003.

(51) Int. Cl.
*F16D 47/02* (2006.01)
*F16D 41/20* (2006.01)
*F16F 15/123* (2006.01)

(52) U.S. Cl. .......... 192/41 S; 192/55.61; 192/81 C; 474/94

(58) Field of Classification Search .......... 192/55.61, 192/211; 464/67.1, 68.91
See application file for complete search history.

(56) References Cited

U.S. PATENT DOCUMENTS

| 773,320 | A | 10/1904 | Haase |
| 2,396,985 | A | 3/1946 | Burrus |
| 2,551,739 | A | 5/1951 | Harlan |
| 2,633,953 | A | 4/1953 | Gorske |
| 2,794,524 | A | 6/1957 | Sacchini |
| 2,829,748 | A | 4/1958 | Sacchini et al. |
| 2,866,349 | A | 12/1958 | Heckethorn |
| 2,885,896 | A | 5/1959 | Hungerford et al. |
| 2,968,380 | A | 1/1961 | Sacchini et al. |

(Continued)

FOREIGN PATENT DOCUMENTS

DE 19636628 C1 4/1998

(Continued)

OTHER PUBLICATIONS

EPO Communication dated Dec. 6, 2010 in related European Patent Application No. 10011294.5.

*Primary Examiner* — Richard M. Lorence
(74) *Attorney, Agent, or Firm* — Harness, Dickey & Pierce, P.L.C.

(57) ABSTRACT

A decoupler assembly that includes a hub, a drive member disposed about the hub, and a clutch coupling the hub and the drive member. The drive member is disposed about the hub for rotation about a rotational axis and includes an inner clutch surface. The clutch includes a carrier, a plurality of arcuate springs, and a wrap spring. The carrier is received between the hub and the drive member. The arcuate springs are mounted to the carrier and are configured to transmit rotary power between the carrier and the hub. The wrap spring includes a proximal end, which is drivingly coupled to the carrier, and a plurality of helical coils that are engaged to the inner clutch surface of the drive member.

20 Claims, 10 Drawing Sheets

U.S. PATENT DOCUMENTS

| | | | |
|---|---|---|---|
| RE25,229 | E | 8/1962 | Sacchini et al. |
| 3,059,493 | A | 10/1962 | Wolfram |
| 3,081,856 | A | 3/1963 | Wolfram et al. |
| 3,242,696 | A | 3/1966 | Kaplan |
| 3,249,190 | A | 5/1966 | Botnick |
| 3,298,486 | A | 1/1967 | Perryman |
| 3,618,730 | A | 11/1971 | Mould, III |
| 4,460,076 | A | 7/1984 | Yamada |
| 4,596,538 | A | 6/1986 | Henderson |
| 4,613,029 | A * | 9/1986 | Beccaris ............... 192/210 |
| 4,813,525 | A | 3/1989 | Ranger et al. |
| 4,830,151 | A | 5/1989 | Numata |
| 5,065,642 | A * | 11/1991 | Kagiyama et al. ......... 464/68.41 |
| 5,083,983 | A | 1/1992 | Hirai et al. |
| 5,139,463 | A | 8/1992 | Bytzek et al. |
| 5,156,573 | A | 10/1992 | Bytzek et al. |
| 5,184,705 | A | 2/1993 | Sekiguchi et al. |
| 5,195,932 | A | 3/1993 | Hirai et al. |
| 5,256,113 | A | 10/1993 | Bushman et al. |
| 5,370,586 | A | 12/1994 | Thomsen et al. |
| 5,377,962 | A | 1/1995 | Ochs et al. |
| 5,437,205 | A | 8/1995 | Tseng |
| 5,598,913 | A | 2/1997 | Monahan et al. |
| 5,681,221 | A | 10/1997 | Albers et al. |
| 5,879,254 | A | 3/1999 | Tanaka |
| 6,024,196 | A | 2/2000 | Miyata |
| 6,044,943 | A | 4/2000 | Bytzek et al. |
| 6,048,284 | A | 4/2000 | Gerhardt et al. |
| 6,083,130 | A | 7/2000 | Mevissen et al. |
| 6,119,841 | A | 9/2000 | Orlamunder |
| 6,394,247 | B1 | 5/2002 | Monahan et al. |
| 6,394,248 | B1 | 5/2002 | Monahan et al. |
| 6,554,113 | B2 | 4/2003 | Li et al. |
| 6,676,548 | B2 | 1/2004 | Fujiwara |
| 6,761,656 | B2 | 7/2004 | King et al. |
| 7,052,420 | B2 | 5/2006 | King et al. |
| 7,153,227 | B2 | 12/2006 | Dell et al. |
| 7,207,910 | B2 | 4/2007 | Dell et al. |
| 7,624,852 | B2 * | 12/2009 | Mevissen et al. ............ 192/41 S |
| 2002/0019263 | A1 * | 2/2002 | Jackel et al. .................... 464/67 |
| 2003/0051960 | A1 | 3/2003 | Li et al. |
| 2003/0098215 | A1 | 5/2003 | Miller et al. |
| 2004/0112700 | A1 | 6/2004 | Liston et al. |
| 2005/0250607 | A1 | 11/2005 | Jansen et al. |
| 2006/0144664 | A1 | 7/2006 | Antchak et al. |

FOREIGN PATENT DOCUMENTS

| | | |
|---|---|---|
| EP | 095842 | 12/1983 |
| EP | 1279807 A1 | 1/2003 |
| EP | 1279807 B1 | 1/2004 |
| FR | 2676789 A1 | 11/1992 |
| GB | 575067 | 12/1943 |
| GB | 2250566 A | 10/1992 |
| JP | 06374527 | 5/1988 |
| JP | 1030450 A | 2/1989 |
| WO | 9612122 | 4/1996 |
| WO | 9850709 | 11/1998 |
| WO | 0192746 A1 | 12/2001 |
| WO | 2004070225 A1 | 8/2004 |
| WO | 2005028899 A1 | 3/2005 |

* cited by examiner

DECOUPLER ASSEMBLY

CROSS-REFERENCE TO RELATED APPLICATIONS

This application is a continuation of U.S. patent application Ser. No. 10/572,128 filed on Mar. 16, 2006 now U.S. Pat. No. 7,624,852, which is a National Stage of International Application No. PCT/CA04/01696 filed on Sep. 22, 2004, which claims the benefit of U.S. Provisional Application No. 60/504,934, filed on Sep. 22, 2003. The entire disclosures of each of the above applications are incorporated herein by reference.

FIELD

The present disclosure relates to a decoupler assembly. Such decoupler assembly can be employed to transmit rotary power between a driving member and a driven member while permitting the driven member to be decoupled from the driving member so that the driven member may overrun or operate temporarily at a speed different from that of the driving member and to decouple or mechanically isolate the driven member from the driving member and reduce torsional vibrations transmitted therebetween.

BACKGROUND

This section provides background information related to the present disclosure which is not necessarily prior art.

It is widely known in an automotive vehicle engine to transfer a portion of the engine output to a plurality of belt driven accessory components utilizing an endless serpentine belt. Typically, each belt driven accessory component includes a pulley drivingly engaged with the belt and the belt is driven by an output pulley coupled directly to the crankshaft.

Internal combustion engines operate as a pulse system, constantly accelerating and decelerating and causing engine vibrations. As a result of these changing speeds, the belt driven accessory components, which are driven by the crankshaft, are continually trying to speed up and slow down. This can result in unacceptable levels of noise and vibration along with reduced accessory drive component durability due to high fluctuating loads and vibrations. Additionally, rapid engine accelerations and deceleration, such as during transmission shifts and engine startup and shutdown, cause belt squeal from slippage between the belt and the pulley as well as heavy impact loading on the belt.

It is known to provide a decoupler assembly between the belt driven accessory component and the pulley to allow the belt driven accessory component to operate temporarily at a higher speed or "overrun" the pulley as the pulley oscillates with the speed of the engine. Examples of such decouplers are disclosed in the U.S. Pat. No. 6,083,130, issued to Mevissen et al. on Jul. 4, 2000 and the U.S. Pat. No. 5,139,463, issued to Bytzek et al. on Aug. 18, 1992.

It is also known to provide a decoupler assembly between the belt driven accessory and the pulley to isolate vibrations therebetween and allow overrunning, reducing noise and impact loads. An example of such a decoupler is disclosed in U.S. Pat. No. 6,044,943 issued to Bytzek et al. on Apr. 4, 2000.

However, it remains desirable to provide an improved decoupler assembly.

SUMMARY

This section provides a general summary of the disclosure, and is not a comprehensive disclosure of its full scope or all of its features.

In one form, the present disclosure provides a decoupler assembly that includes a hub, a drive member disposed about the hub, and a clutch coupling the hub and the drive member. The drive member is disposed about the hub for rotation about a rotational axis and includes an inner clutch surface. The clutch includes a carrier, a plurality of arcuate springs, and a wrap spring. The carrier is received between the hub and the drive member. The arcuate springs are mounted to the carrier and are configured to transmit rotary power between the carrier and the hub. The wrap spring includes a proximal end, which is drivingly coupled to the carrier, and a plurality of helical coils that are engaged to the inner clutch surface of the drive member.

In another form, the present disclosure provides a decoupler assembly that includes a hub, a drive member, a clutch, which couples the hub and the drive member, and a lubricant. The hub has a rotational axis and includes a plurality of radially extending tabs. Each of the tabs has a leading edge and a trailing edge. The drive member is disposed about the hub for rotation about the rotational axis and includes an inner clutch surface. The clutch includes a carrier, a rim, a plurality of arcuate compression springs, a wrap spring and a non-metallic bumper. The carrier is received between the hub and the drive member and includes a carrier member and an insert. The carrier member defines a recess into which the insert is received and the insert includes a clutch stop. The rim is coupled to the carrier and configured to abut an end of the wrap spring in at least two locations. Each of the arcuate compression springs is mounted inside the carrier and engaged against an associated one of the leading edges of tabs of the hub. The wrap spring includes a proximal end and a plurality of helical coils that are engaged to the inner clutch surface of the drive member. The proximal end has an end face that is abutted against the clutch stop. The non-metallic bumper is coupled to the carrier. Contact between one of the trailing edges and the non-metallic bumper limits relative rotation between the carrier and the hub in a predetermined rotational direction. The lubricant is disposed between the carrier and the arcuate compression springs.

In yet another form, the present disclosure provides a decoupler assembly with a hub, a drive member and a clutch that couples the hub and the drive member. The drive member is disposed about the hub for rotation about a rotational axis of the hub. The drive member has an inner clutch surface. The clutch includes a carrier, a plurality of springs and a wrap spring. The springs deflect in response to transmission of torque between the hub and the carrier when the torque has a magnitude that is within a predetermined range. The wrap spring is rotatably coupled to the carrier and has a plurality of coils that are engaged to the inner clutch surface. The decoupler assembly also includes a lubricant received between the carrier and the at least one spring.

In still another form, the present disclosure provides a decoupler assembly with a hub, a drive member and a clutch that couples the hub and the drive member. The drive member is disposed about the hub for rotation about a rotational axis of the hub. The drive member has an inner clutch surface. The clutch includes a carrier, a plurality of springs and a wrap spring. The springs deflect in response to transmission of torque between the hub and the carrier when the torque has a magnitude that is within a predetermined range. The wrap spring is rotatably coupled to the carrier and has a plurality of coils that are engaged to the inner clutch surface. The clutch also includes a clip that is coupled to the carrier. The clip abuts an axial end of the wrap spring such that rotary power is transmitted between the carrier and the wrap spring through an interface at which the clip and the axial end abut one another.

In a further form, the present disclosure provides a decoupler assembly with a hub, a drive member and a clutch that couples the hub and the drive member. The drive member is disposed about the hub for rotation about a rotational axis of the hub. The drive member has an inner clutch surface. The clutch includes a carrier, a plurality of springs and a wrap spring. The springs deflect in response to transmission of torque between the hub and the carrier when the torque has a magnitude that is within a predetermined range. The wrap spring is rotatably coupled to the carrier and has a plurality of coils that are engaged to the inner clutch surface. The carrier includes first and second shell members that are fixedly coupled to one another via rivets, fasteners or combinations thereof.

In still another form, the present disclosure provides a decoupler assembly with a hub, a drive member and a clutch that couples the hub and the drive member. The drive member is disposed about the hub for rotation about a rotational axis of the hub. The drive member has an inner clutch surface. The clutch includes a carrier, a plurality of springs and a wrap spring. The springs deflect in response to transmission of torque between the hub and the carrier when the torque has a magnitude that is within a predetermined range. The wrap spring is rotatably coupled to the carrier and has a plurality of coils that are engaged to the inner clutch surface. The clutch includes a non-metallic bumper that limits rotation of the hub relative to the carrier.

In yet another form, the present disclosure provides a decoupler assembly with a hub, a drive member and a clutch that couples the hub and the drive member. The drive member is disposed about the hub for rotation about a rotational axis of the hub. The drive member has an inner clutch surface. The clutch includes a carrier, a plurality of springs and a wrap spring. The springs deflect in response to transmission of torque between the hub and the carrier when the torque has a magnitude that is within a predetermined range. The wrap spring is rotatably coupled to the carrier and has a plurality of coils that are engaged to the inner clutch surface. The carrier includes a rim element that contacts the inner clutch surface during operation of the carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

An example embodiment will now be described more fully with reference to the accompanying drawings.

Figure 1:
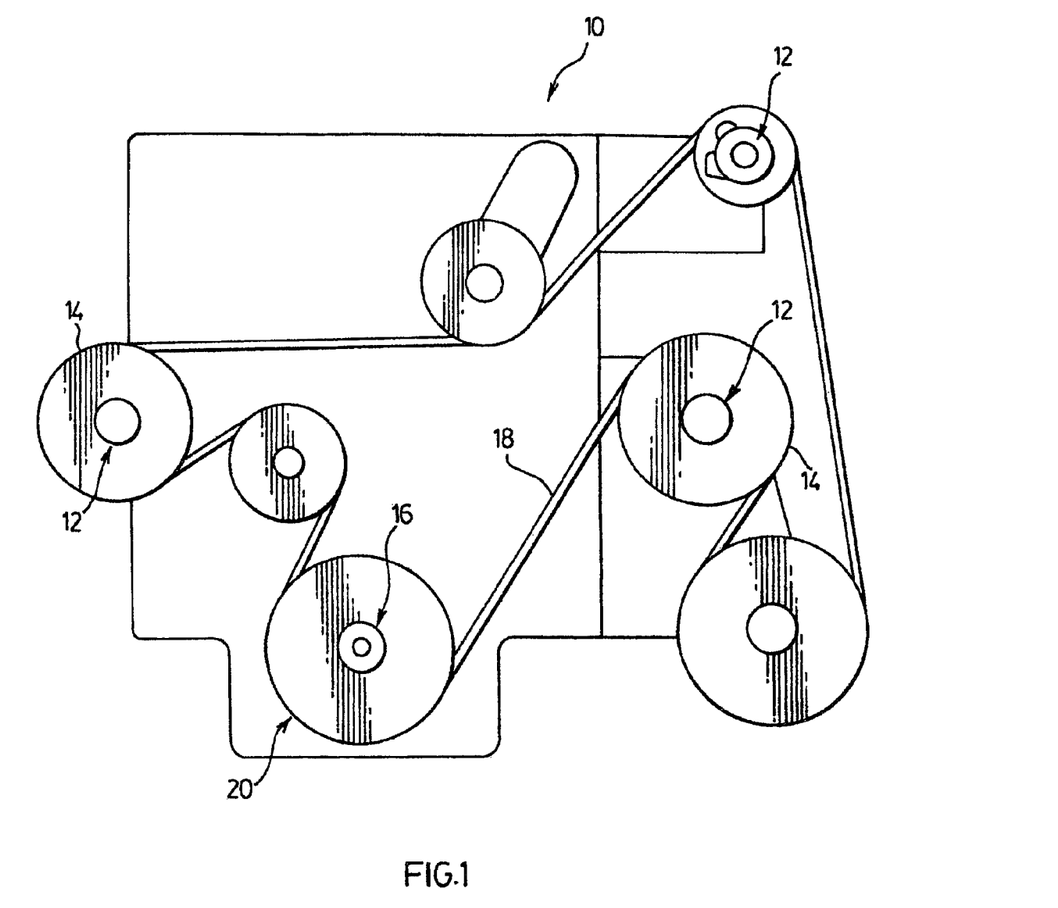
FIG. 1 is a front view of an engine of an automotive vehicle incorporating a decoupler assembly according to one aspect of the present disclosure.

Referring to FIG. 1, an internal combustion engine for an automotive vehicle is generally indicated at 10. The engine 10 includes a plurality of belt driven accessory components 12, such as an alternator, compressor, etc. A pulley 14 is operatively coupled to each of the belt driven accessory components 12 for driving the components 12 via rotation of the pulley 14. The engine 10 also includes a crankshaft 16, which generally provides the mechanical torque output resulting from the operation of the engine 10. An endless serpentine belt 18 is seated about each pulley 14 of the belt driven accessory components 12. The belt 18 is driven in a driven direction by the rotation of the crankshaft 16, which causes rotation of the pulleys 14. A crankshaft torque modulator or decoupler assembly 20 is operatively coupled between the crankshaft 16 and the belt 18.

Figure 2:
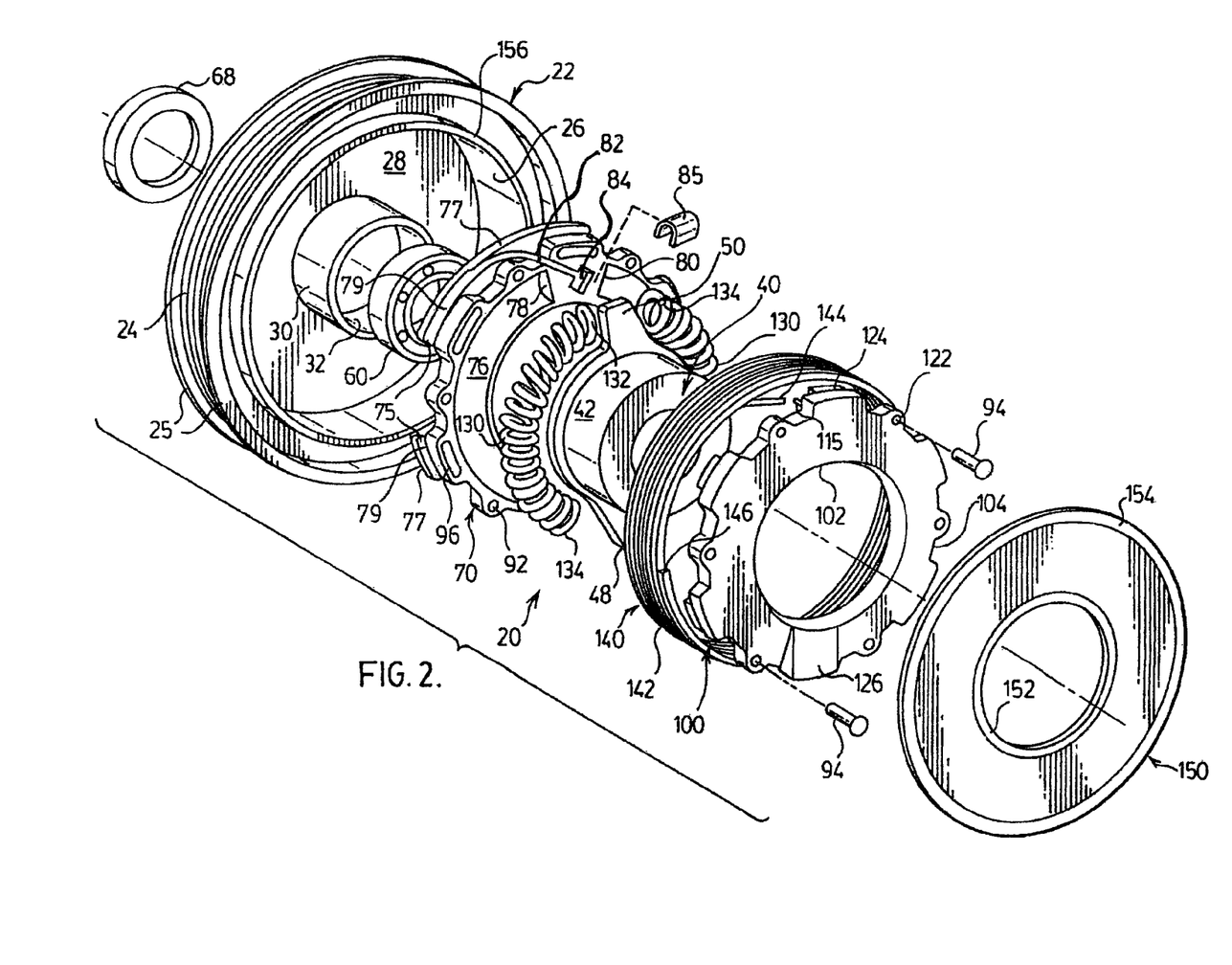
FIG. 2 is an exploded perspective view of the decoupler assembly of FIG. 1.

Referring to FIG. 2, the decoupler assembly 20 is shown in an exploded view and includes an output pulley 22 having an annular outer track 24 defined between a pair of spaced apart, raised and parallel rims 25 that seats the belt 18 therein. The output pulley 22 also includes an annular inner clutch surface 26 opposite and generally concentric with the outer track 24. The output pulley 22 further includes a face plate 28 extending between the outer track 24 and the inner clutch surface 26. A hollow, cylindrical hub 30 projects axially from the center of the face plate 28 concentric with the inner clutch surface 26 for defining a hub bearing surface 32.

Figure 3:
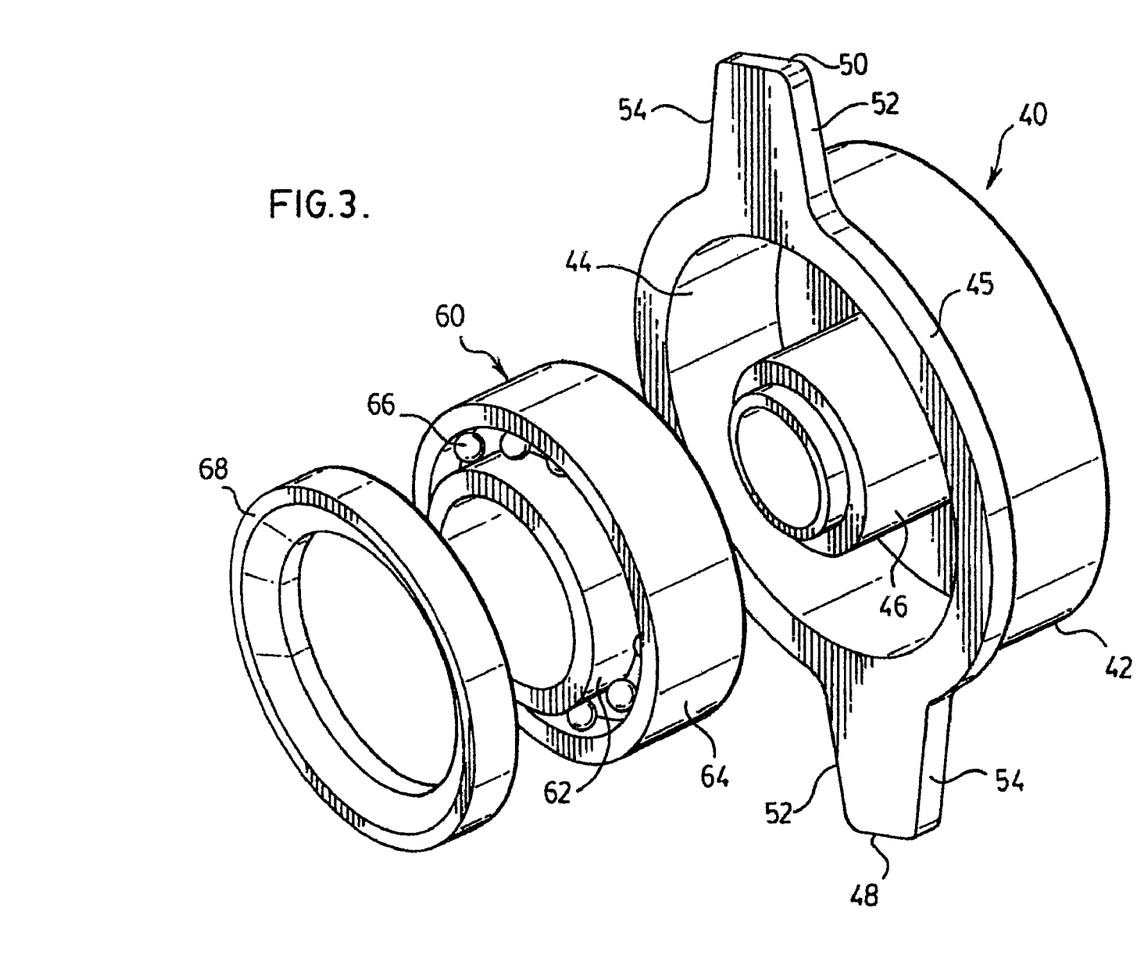
FIG. 3 is an exploded perspective view of a portion of the decoupler assembly of FIG. 1, illustrating the drive hub and the bearing assembly in more detail.
Figure 4:
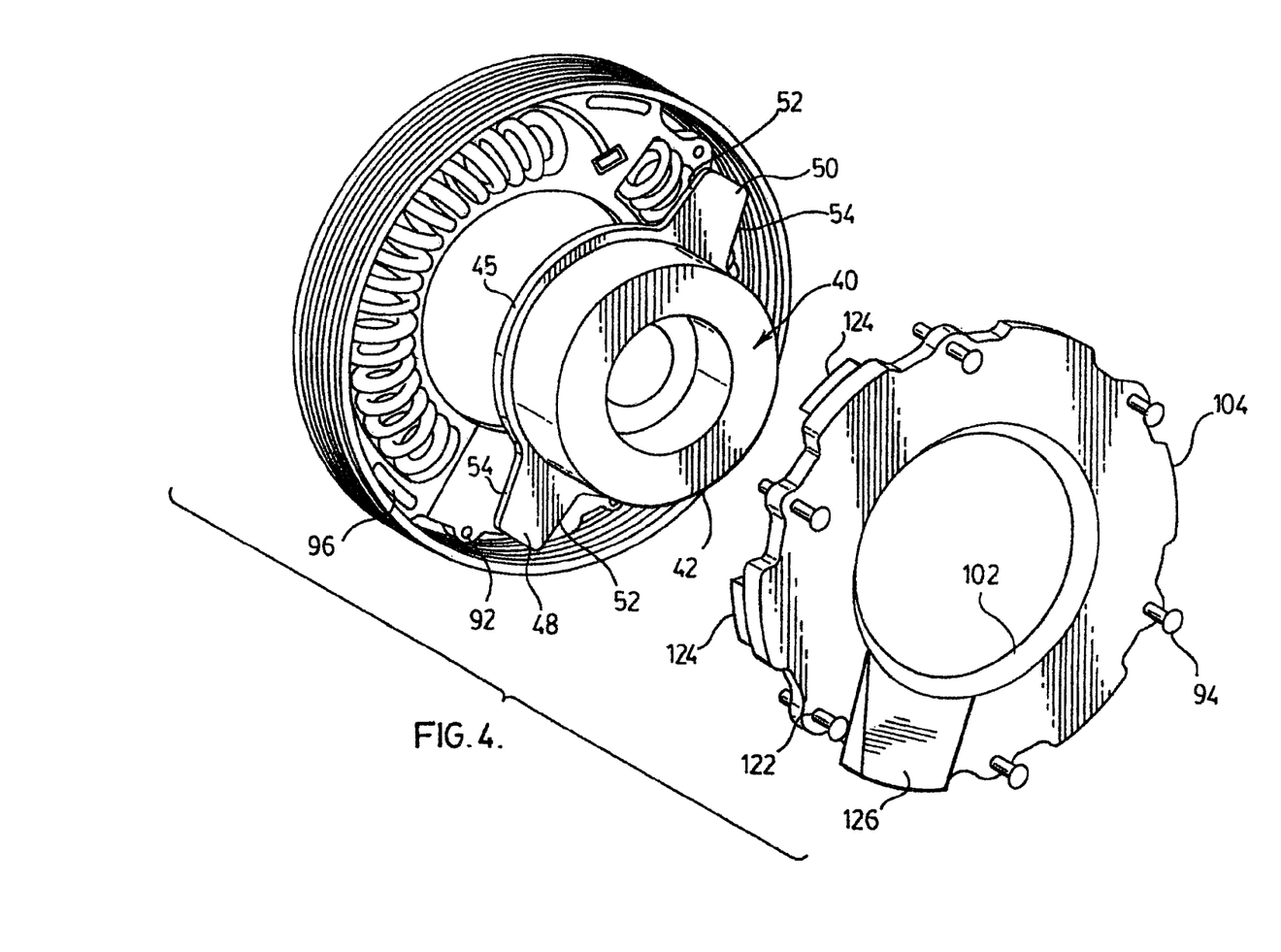
FIG. 4 is an exploded perspective view of a portion of the decoupler assembly of FIG. 1, illustrating the drive hub, the upper and lower spring shells and the clutch element.
Figure 5:
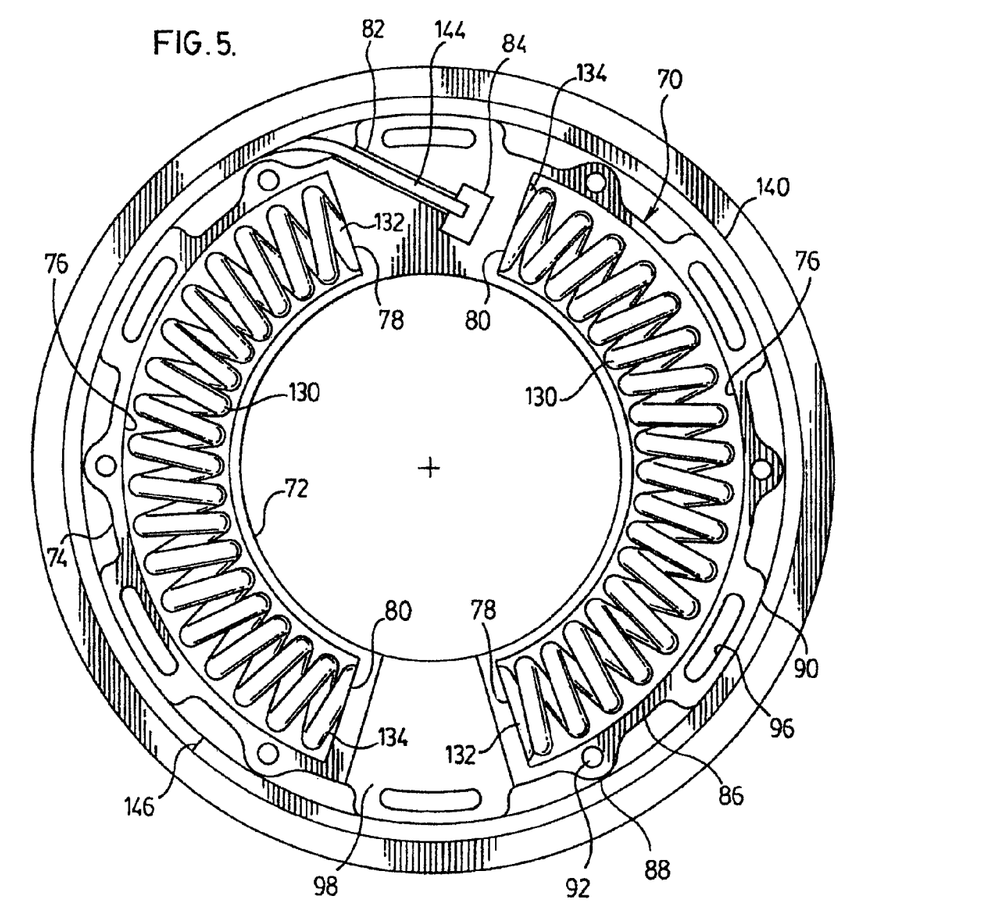
FIG. 5 is a plan view of a portion of the decoupler assembly of FIG. 1, illustrating the lower spring shell, the biasing members and the clutch element.
Figure 6:
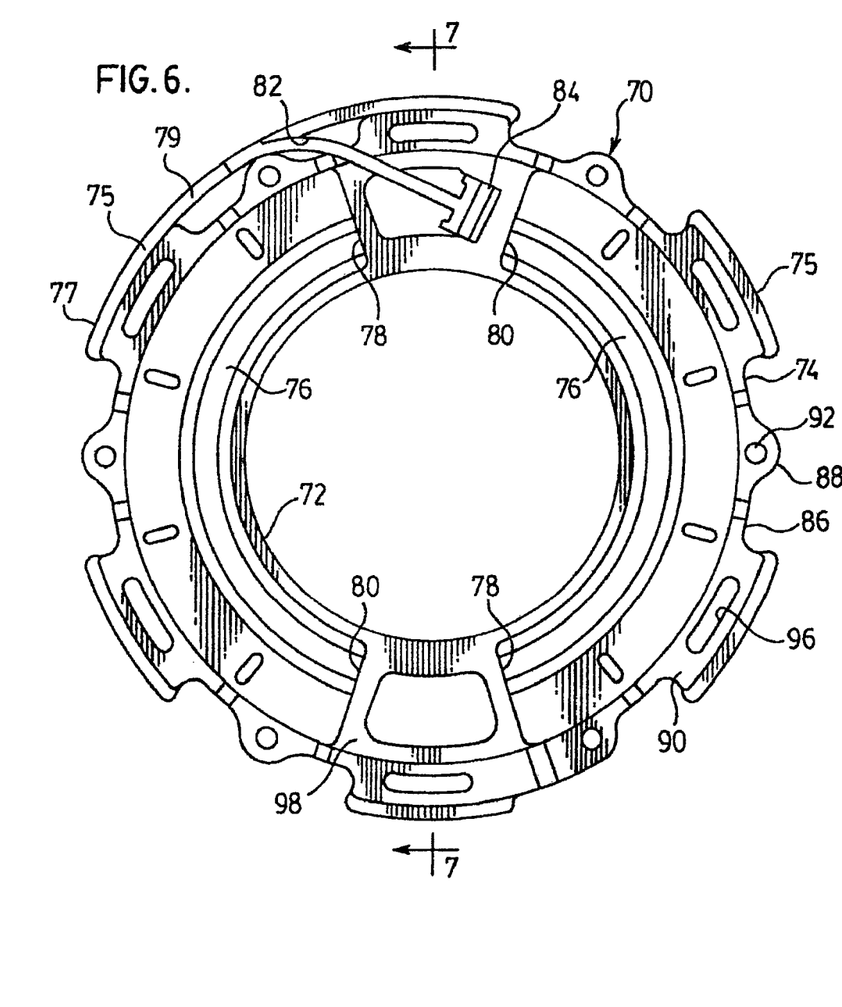
FIG. 6 is a plan view of the lower spring shell.
Figure 7:
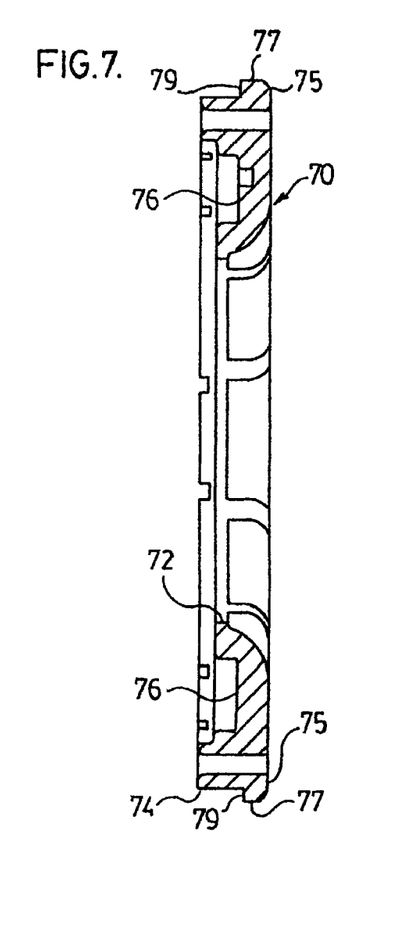
FIG. 7 is a cross-sectional view taken along line 7-7 of FIG. 6.

Referring to FIGS. 2-4, the decoupler assembly 20 also includes a drive hub 40, preferably formed of metal, fixedly secured to the crankshaft 16 by any suitable fastener or connection means for rotation therewith. The drive hub 40 includes a generally cup-shaped cylindrical main body 42 defining an inner surface 44 and having a circumferential radial rim 45. A bearing post 46 extends axially from the center of the main body 42 to a distal end. At least one, but preferably a plurality of tabs 48, 50 extends radially outwardly radial rim 45 of the main body 42. Each tab 48, 50 includes a leading edge 52 extending generally perpendicularly from the main body 42 and a trailing edge 54 extending angularly from the main body 42.

A bearing assembly 60 rotatably couples the output pulley 22 and the drive hub 40. The bearing assembly 60 includes a circular inner race 62 surrounding by a circular outer race 64. A plurality of ball bearings 66 are seated between the inner race 62 and outer race 64. The inner race 62 is seated around the bearing post 46 of the drive hub 40 and the outer race 64 is press fit against the bearing surface 32 of the output pulley 22 to provide the rotatable connection therebetween. In the preferred embodiment, the inner race 62 projects axially beyond the outer race 64 to form a shoulder to receive a disc-shaped seal 68 thereon to seal the ball bearings 66 between the inner race 62 and outer race 64 and to seal an oil or grease lubricant within the bearing assembly 60 and output pulley 22, as will be described in further detail herein below. However, the inner race 62 may be axial flush with the end of the outer race 64. In such case, the seal 68 may be seated around an extended collar portion of the bearing post 46 to seal against the ends of both the inner race 62 and outer race 64. The seal 68 may be separate or an integral part of the bearing assembly 60. Alternatively, a bushing can be used instead of the bearing assembly 60. Generally, the bushing would provide greater damping over the bearing assembly 60.

Referring to FIGS. 2, and 4-7, the decoupler assembly 20 further includes a lower spring shell 70 and an upper spring shell 100 operatively coupled to the drive hub 40. Each of the shells 70, 100 is preferably molded of an organic plastic material. The lower spring shell 70 is generally disc-shaped and extends between cylindrical and generally concentric inner and outer surfaces 72, 74. A radial rim element 75 projects radially from at least portions of the outer surface 74 forming a shelf or shoulder and outer peripheral bearing surface 77 for frictionally engaging and supporting the inner clutch surface 26 of the output pulley 22. The radial rim element 75 as shown in the preferred embodiment extends only along portions of the periphery of the outer surface to reduce the weight of the lower spring shell 70. However, it should be appreciated that the rim element 75 may be a contiguous circumferential rim extending around the entire periphery of the outer surface 74. Further, the radial rim element 75 increases in its axial thickness incrementally and continuously around the circumference of the outer surface 74 to form a helical contour or ramped support surface 79. At least one, but preferably a plurality of trenches 76 is formed and recessed in the lower spring shell 70 between the inner and outer surfaces 72, 74. Each trench 76 extends arcuately between a first end 78 and a second end 80. The trenches 76 are aligned end to end and arranged in a generally circular manner along the perimeter of the lower spring shell 70. A retaining slot 82 extends diagonally between the adjacent ends of the trenches 76 from the outer surface 74 to a generally rectangular cavity 84. An L-shaped or U-shaped blocking tab or clutch stop 85, preferably formed of stamped metal, is seated in the cavity 84. A plurality of cutouts 86 is formed in the outer surface 74 to reduce the weight of the lower spring shell 70 and to form a series of alternating undulations 88, 90 in the outer surface 74. Additionally, a lubricant can be supported in the cutouts 86 for lubricating the inner clutch surface 26 of the output pulley 22. The undulations 88 each include a bore 92 therethrough for receiving a fastener 94, such as a rivet or screw, to fixedly secure the lower spring shell 70 to the upper spring shell 100. The undulations 90 each include an elongated slot 96 for aligning with and engaging with the upper spring shell 100 as will be further described below. Further, the lower spring shell 70 includes an enlarged counter-balance block 98 formed between the inner surface 72 and the outer surface 74 positioned radially opposite the retaining slot 82 and cavity 84 to rotationally balance the lower spring shell 70.

Figure 8:
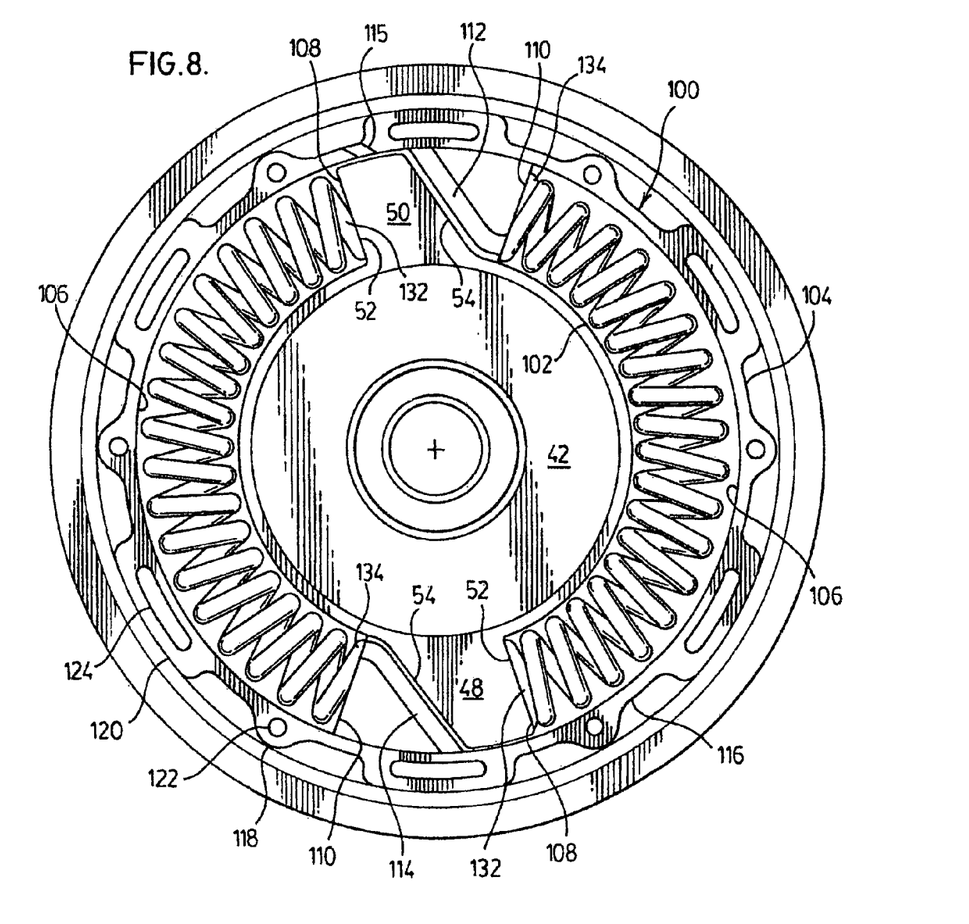
FIG. 8 is a plan view of the upper spring shell, biasing members and clutch element.
Figure 9:
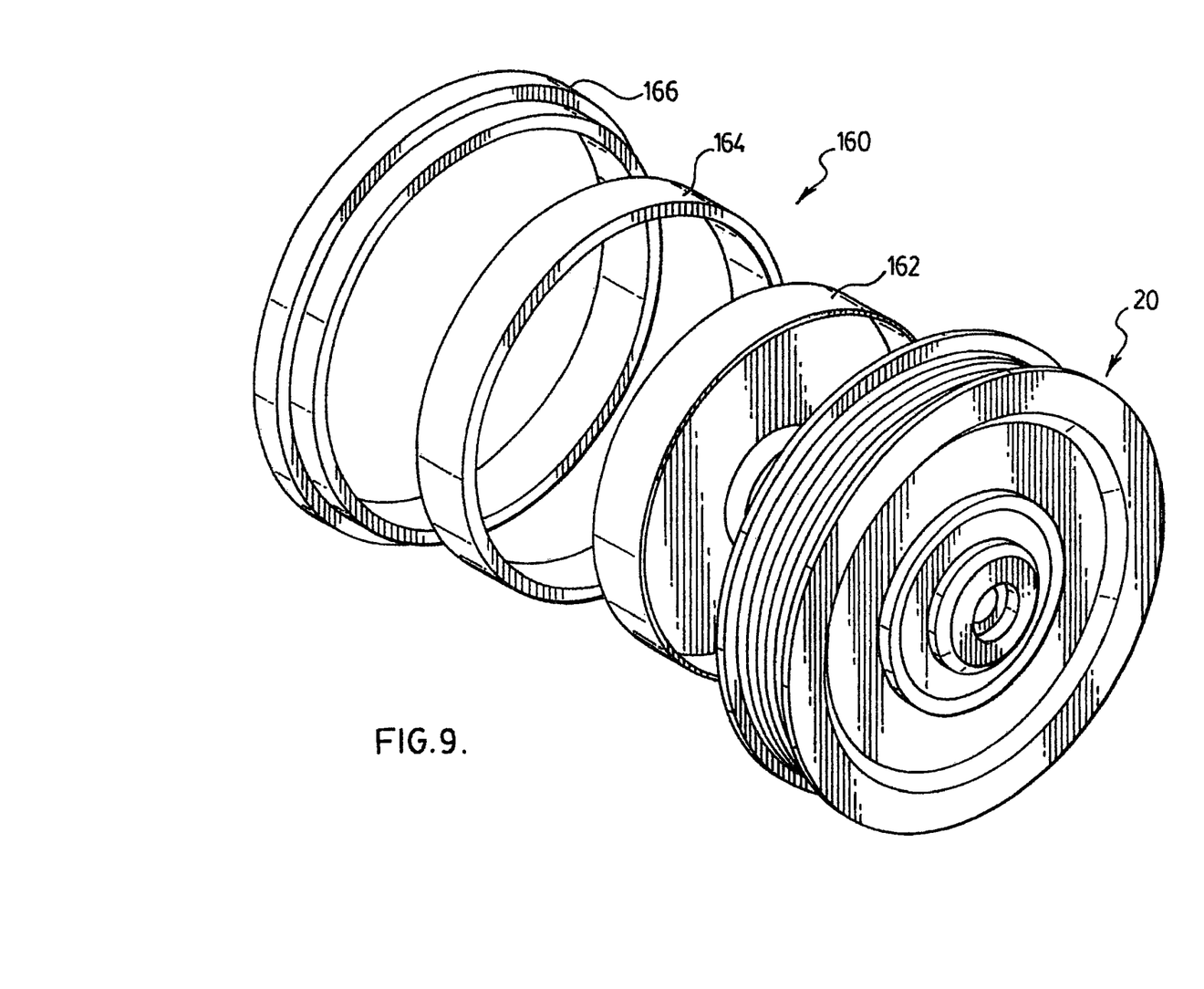
FIG. 9 is an exploded perspective view of an assembly that includes the decoupler assembly of FIG. 1 and a torsional vibration damper.

Referring to FIGS. 2, 4, and 8, the upper spring shell 100 is also generally disc-shaped and extends between cylindrical and generally concentric inner and outer surfaces 102, 104. At least one, but preferably a plurality of trenches 106 is formed and recessed in the upper spring shell 100 between the inner and outer surfaces 102, 104. Each trench 106 extends arcuately between a first end 108 and a second end 110. The trenches 106 are aligned end to end and arranged in a generally circular manner along the perimeter of the upper spring shell 100. A raised blocking wall 112, 114 extends diagonally between each of the pair of adjacent ends of the trenches 106 from the outer surface 102 to the second end 110 of each trench 106 for abutting with the trailing edge 54 of each respective tabs 48, 50 of the drive hub 40. Further, one of the blocking walls 112, 114 is arranged to overlay the clutch stop 85 to retain the stop 85 within the cavity 84 of the lower spring shell 70. The upper spring shell 100 further includes an axially extending alignment tab 115 extending diagonally between the inner surface 102 and outer surface 104. The alignment tab 115 is sized to be received within the retaining slot 82 to ensure correct orientation between the lower and upper spring shells 70, 100. A plurality of cutouts 116 is formed in the outer surface 104 to reduce the weight of the upper spring shell 100 and to form a series of alternating undulations 118, 120 in the outer surface 104. Additionally, a lubricant can be supported in the cutouts 116 for lubricating the inner clutch surface 26 of the output pulley 22. The undulations 118 each include a bore 122 therethrough aligned axial with a corresponding bore 92 in the lower spring shell 70 for receiving the fastener 94 to fixedly secure the lower spring shell 70 to the upper spring shell 100. The undulations 120 each include an axially projecting and slightly tapered tab 124 for aligning axially with a corresponding elongated slot 96 in the lower spring shell 70 and for providing a rigid connection to transmit torque between the lower spring shell 70 and the upper spring shell 100. Further, the upper spring shell 100 includes an enlarged counter-balance block 126 formed between the inner surface 102 and the outer surface 104 positioned radially opposite the retaining slot 82 and cavity 84 in the lower spring shell 70 to rotationally balance the lower and upper spring shells 70, 100.

The decoupler assembly 20 also includes a plurality of biasing members 130 in the form of helical coil springs. A biasing member 130 is supported in each of the radially and axially aligned trenches 76; 106 between the lower spring shell 70 and upper spring shell 100. Each biasing member 130 extends arcuately between first and second spring ends 132, 134. Approximately one-half of the first and second spring ends 132, 134 abuts the first and second ends 78, 80 of the trenches 76 in the lower spring shell 70 and the other one-half abuts the first and second ends 108, 110 of the trenches 106 in the upper spring shell 100. When the lower and upper spring shells 70, 100 are aligned axially and radially and pressed together, the biasing members 130 are seated in the corresponding trenches 76, 106 between the lower and upper spring shells 70, 100. The biasing members 130 may be preformed in an arcuate shaped corresponding to the arcuate shape of the trenches 76, 106 or may be straight and then bent into shape when seated within the trenches 76, 106. It should also be appreciated that the biasing members 130 may include any compressible or resilient member seated within the trenches 76, 106, such as a rubber strut type member or compressible fluid. Preferably, a lubricant, such as grease or oil, is disposed in the trenches 76, 106 to reduce friction between the biasing members 130 and the spring shells 70, 100. Generally, the lubricant also enhances damping characteristics of the decoupler assembly 20. The damping characteristics can be tuned for a particular application. That is, the damping characteristics can be decreased or increased, depending on the type of lubricant placed in the trenches 76, 106 and decoupler assembly 20.

A clutch element 140 is disposed adjacent the inner clutch surface 26 of the output pulley 22. More specifically, the clutch element 140 is a coil spring having a plurality of coils 142 extending helically between a proximal end 144 and distal end 146. The proximal end 144 of the clutch element 140 is fixedly held in the retaining slot 82 in the lower spring shell 70. The tip of the proximal end 144 of the clutch element 140 extends into the cavity 84 and abuts the clutch stop 85. The clutch element 140 is supported by the radial rim element 75 such that the ramped support surface 79 of the rim element 75 correspondingly mates with the contour of the helical coils 142. The coils 142 are outwardly frictionally engaged with the inner clutch surface 26, such that rotational acceleration of the drive hub 40 relative to the output pulley 22 in the driven direction of the crankshaft 16 causes the coils 142 to expand radially outwardly to couple the drive hub 40 and output pulley 22. The coils 142 grip the inner clutch surface 26 so that the output pulley 22 rotates with the drive hub 40. Conversely, deceleration of the drive hub 40 relative to the output pulley 22 causes the coils 142 to contract radially inwardly. The coils 142 release grip of the inner clutch surface 26 to allow the output pulley 22 to overrun the drive hub 40. Preferably, the coils 72 have a rectangular cross section.

Referring again to FIG. 2, the decoupler assembly 20 is assembled by seating the biasing members 130 in the trenches 76 of the lower spring shell 70. The clutch stop 85 is placed in the cavity 84. The clutch element 140 is positioned around the lower spring shell 70 and the proximal end 144 is recessed within the retaining slot 82 with the end thereof abutting the clutch stop 85. The clutch element 140 is supported by the radial rim element 75 such that the helical coils 142 mate with the helical contour of the ramped support surface 79 formed by the rim element 75. The drive hub 40 is then positioned in the center of the lower spring shell 70 such that the radial rim 45 is seated against the periphery around the inner surface 72 and the tabs 48, 50 are positioned between the adjacent ends of the trenches 76. Next, the upper spring shell 100 is aligned axially and radially with the lower spring shell 70 such that the biasing members 130 are seated in the trenches 106 and the tabs 48, 50 are similarly positioned between the adjacent ends of the trenches 106. The alignment tab 115 is arranged to be received within the retaining slot 82 to ensure proper orientation between the shells 70, 100 and to position the counter-balance blocks 98, 126 opposite the proximal end 144 of the clutch element 140. The counter-balance block 126 should be arranged generally 180 degrees opposite the proximal end 144 of the clutch element 140. The alignment tab 115 also engages and presses down on the proximal end 144 of the clutch element 140 to retain the end 144 within the retaining slot 82. The upper spring shell 100 is similarly seated within the circumference of the clutch element 140. The axially projecting and tapered tabs 124 are received within the corresponding slots 96 in the lower spring shell 70 to provide a rigid connection and transmit torque between the shells 70, 100. The upper and lower spring shells 70, 100 are fixedly connected by passing the fasteners 94 through each of the axially aligned bores 92, 122.

The bearing assembly 60 is press fit against the hub bearing surface 32 of the output pulley 22 and the seal 68 is pressed around the inner race 62 against the shoulder formed with the outer race 64 to seal the bearing assembly 60 and output pulley 22.

The inner cavity of the output pulley 22 is filled with a lubricant, such as grease or oil as desired to reduce friction between the components and provide dampening. A disc-shaped cover plate 150 closes the output pulley 22 and covers the upper spring shell 100. Preferably, the cover plate 150 includes an inner seal 152 for sealing engagement against the main body 42 of the drive hub 40 and an outer peripheral gasket 154 for sealing against the output pulley 22, together providing a fluid tight sealed decoupler assembly 20. The cover plate 150 may be fixedly secured to the output pulley 22 by roll forming the periphery of a lip 156 on the output pulley 22 against the circumferential outer surface of the cover plate 150.

Figure 10:
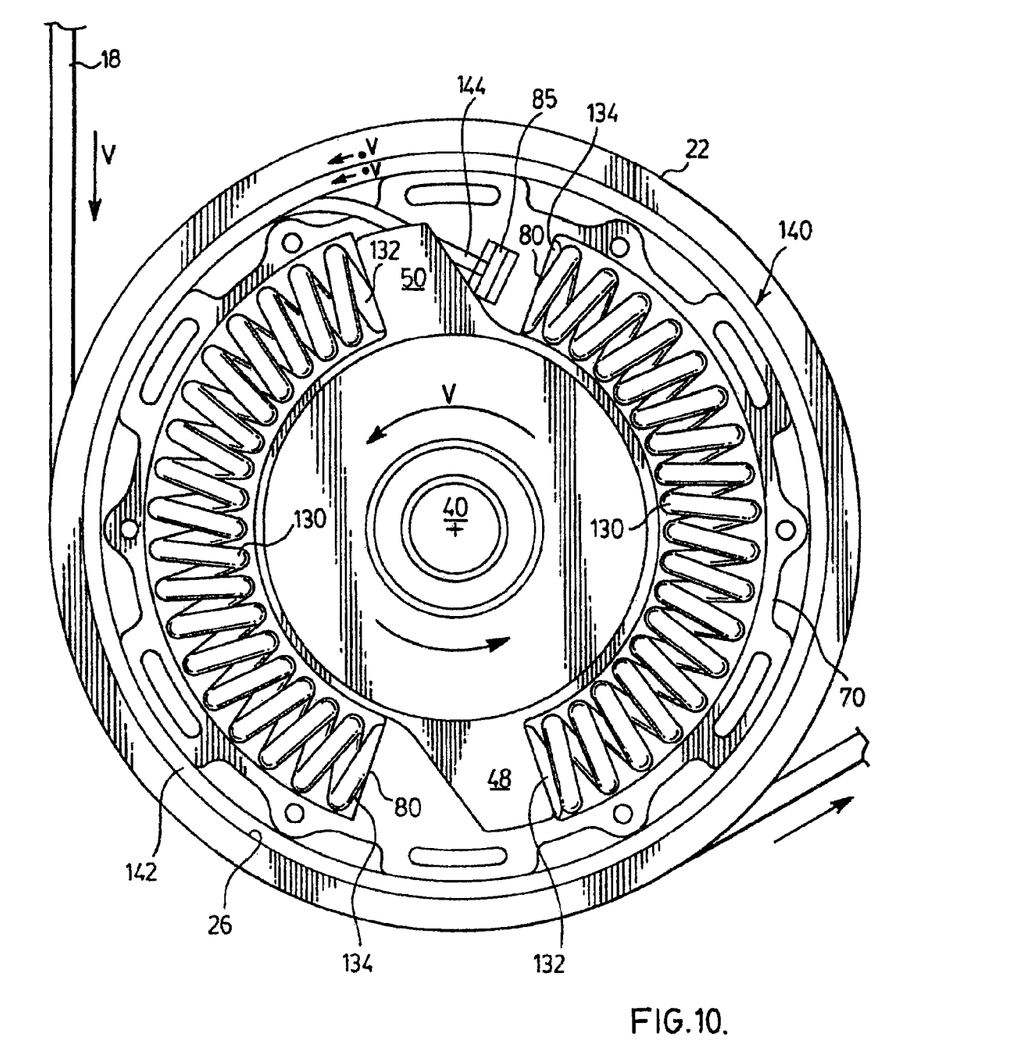
FIG. 10 is a plan view of a portion of the decoupler assembly of FIG. 1 illustrated in an accelerating condition that facilitates driving engagement of the output pulley.

Referring to FIGS. 2 and 10, in operation, the engine 10 rotatably accelerates or decelerates the crankshaft 16 and the drive hub 40 in the driven direction V relative to the output pulley 22. First, during normal acceleration, the tabs 48, 50 engage the first spring ends 132 of the biasing members 130. Initially, the first spring ends 132 are rotatably displaced relative to the respective second spring ends 134 as the biasing members 130 are compressed against the second ends 80, 110 of the trenches 76, 106. The amount of displacement of the second spring ends 134 during acceleration is directly proportional to the rate of acceleration of the drive hub 40 and the stiffness of the biasing members 130. Eventually, the upper and lower spring shells 70, 100, urged by the compressed biasing members 130, accelerate with the drive hub 40. That is, the transfer of torque or acceleration from the drive hub 40 to the upper and lower spring shells 70, 100 is slightly delayed during compression of the biasing members 130. Acceleration of the upper and lower spring shells 70, 100 relative to the output pulley 22 causes the coils 142 to expand radially outwardly toward the inner clutch surface 26. More specifically, the rotation of the lower spring shell 70 urges the blocking tab 85 against the proximal end 144 of the clutch element 140 to radially expand the coils 142 against the inner clutch surface 26. The contour of the retaining slot 82 in the lower spring shell 70 supports the proximal end 144 of the clutch element 140 to prevent localized bending of the coils 142 and urge uniform radial expansion along the entire length of the helical coils 142 against the inner clutch surface 26. The coils 142 grip the clutch surface 26 with sufficient friction so that the output pulley 22 rotates with the drive hub 40, driving the belt 18.

Figure 11:
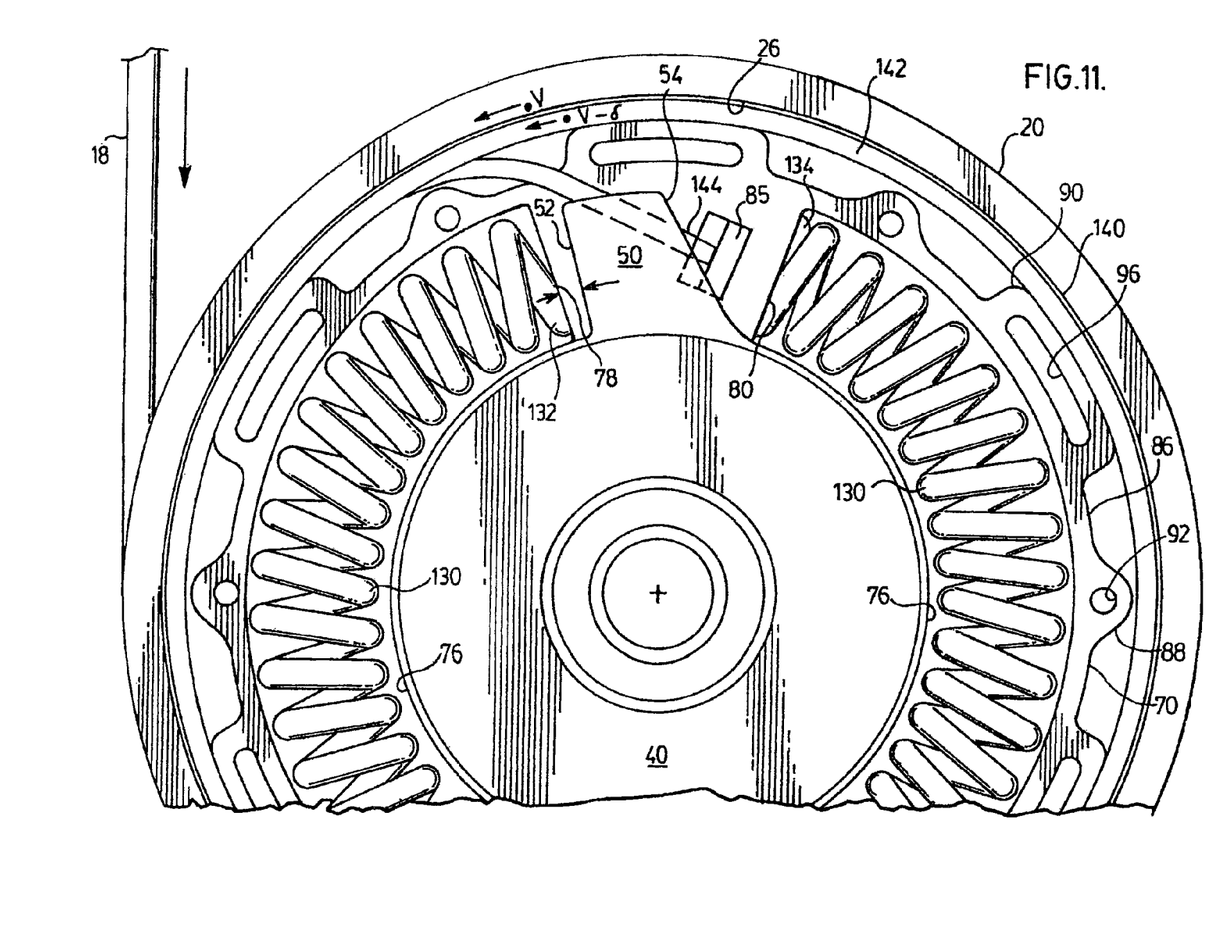
FIG. 11 is a plan view of a portion of the decoupler assembly of FIG. 1 illustrated in a decelerating condition that facilitates the overrunning of the output pulley relative to the drive hub.

Referring to FIGS. 2 and 11, during rapid deceleration of the crankshaft 16 and drive hub 40, which may be caused by transmission shift, engine startup or shutdown, etc., it is desirable to selectively allow the output pulley 22 to rotate at a greater speed than the drive hub 40, or overrun the drive hub 40 and crankshaft 16 to prevent belt slip on the output pulley 22 causing belt squeal or noise. During such deceleration, the tabs 48, 50 decelerate to reduce the load or torque exerted on the first ends 132 of the biasing members 130. The biasing members 130 are allowed to extend or rebound against the tabs 48, 50 to thus also reduce the torque on the upper and lower spring shells 70, 100. The trailing edges 54 of the tabs 48, 50 engage the corresponding blocking walls 112, 114 on the upper spring shell 100 to maintain the acceleration of the spring shells 70, 100 with the acceleration of the hub 40. Deceleration of the spring shells 70, 100 relative to the output pulley 22 causes the coils 142 to contract radially inwardly with respect to the inner clutch surface 26. Contraction of the coils 142 allows the inner clutch surface 26 to slip relative to the clutch mechanism 140, thereby allowing the output pulley 22 to operate at a higher speed (V) than the drive hub 40 and crankshaft 16 (V-.delta.), or overrun the crankshaft 16 and prevent belt slippage on the output pulley 22 and noise in the assembly.

Additionally, during normal acceleration and deceleration of the crankshaft 16 as a result of the engine combustion process, higher frequency oscillatory torsional vibrations and high impact loads are generated within the crankshaft 16. The decoupler assembly 20 also decouples, dampens and mechanically isolates these torsional vibrations between the crankshaft 16 and the output pulley 20. Specifically, oscillatory torsional vibrations from the crankshaft 16 are dampened or isolated from the output pulley 22 by the biasing members 130. Oscillations of the crankshaft 16, and thus drive hub 40, act on the first ends 132 of the biasing members 130 to compress the biasing members 130 against the second ends 80, 110 of the trenches 76, 106. The biasing members 130, or arcuate coil springs, compress and expand continuously with the torsional oscillations of the drive hub 40 to dampen, isolate and absorb the vibration caused by the torsional oscillations. The biasing members 130 thus reduce the impact loads generated within the engine, which would normally be transferred through the crankshaft 16 and into the output pulley 22, and consequently directly into the belt driven accessory components. In other words, the biasing members 130 lower the oscillatory acceleration and deceleration rates and introduce a phase shift between the input force by the drive hub 40 and the output response at the output pulley 22. This phase shift manifests itself as a lowering of the system resonance. By lowering the resonance of the drive assembly, unwanted vibrations are attenuated and torsional displacements induced by a system resonance are eliminated, or avoided.

Thus, the decoupler assembly 20 allows the belt driven accessory components 12 to temporarily operate at a higher speed or "overrun" the crankshaft 16 as the rotational speed of the crankshaft 16 changes with the speed of the engine 10, which results in smoother engine operation, less noise, and increased belt life. The decoupler assembly 20 also dampens or isolates torsional vibrations experienced between the crankshaft 16 and the belt 18 during operation of the engine 10.

Although the decoupler assembly 20 is described above as part of an internal combustion engine, it should be appreciated that the decoupler assembly 20 can be implemented in any rotary or pulley-type belt drive system, such as a generator or a conveyer belt system, or in any system of rigid shafts with pulley or misalignment couplings where a hub load is not necessarily applied.

It should also be appreciated that the output pulley 22 can be adapted to accommodate any type of drive element, such as a plastic or rubber multi-rib belt, a "V" belt, or a synchronous belt. The output pulley 22 can also be adapted to accommodate other drive elements such as a steel flat belt, as used in a continuously variable transmission, for example, or a multi-link chain made of plastic or steel.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A decoupler assembly comprising:
   a hub having a rotational axis;
   a drive member disposed about the hub for rotation about the rotational axis, the drive member having an inner clutch surface; and
   a clutch coupling the hub and the drive member, the clutch comprising a carrier, a plurality of arcuate springs, and a wrap spring, the carrier being received between the hub and the drive member, the arcuate springs being mounted to the carrier and configured to transmit rotary power between the carrier and the hub, the wrap spring comprising a proximal end and a plurality of helical coils, the proximal end being drivingly coupled to the carrier, the helical coils being engaged to the inner clutch surface of the drive member;
   wherein a portion of the helical coils of the wrap spring is wrapped about a perimeter of a portion of the carrier, wherein the portion of the helical coils are disposed between the inner clutch surface and the portion of the carrier, and wherein the arcuate springs are disposed within the carrier so as to be positioned axially along the rotational axis entirely between opposite axial ends of the wrap spring.

2. The decoupler assembly of claim 1, wherein the arcuate springs are compression springs.

3. The decoupler assembly of claim 1, wherein the arcuate springs are disposed within the carrier.

4. The decoupler assembly of claim 3, wherein the carrier comprises a pair of housing shells between which the arcuate springs are received.

5. The decoupler assembly of claim 4, wherein a retaining slot is formed into one of the housing shells and wherein the proximal end of the wrap spring is received in the retaining slot.

6. The decoupler assembly of claim 1, further comprising a lubricating material is disposed between the carrier and the arcuate springs.

7. The decoupler assembly of claim 6, wherein the lubricating material comprises grease, oil or a combination thereof.

8. The decoupler assembly of claim 1, wherein the clutch further comprises a rim against which a first one of the plurality of coils adjacent to the proximal end is abutted, the rim being fixedly coupled to the carrier.

9. The decoupler assembly of claim 8, wherein the rim is configured to abut the wrap spring in at least two locations.

10. The decoupler assembly of claim 9, wherein the rim is helically contoured.

11. The decoupler assembly of claim 8, wherein the rim is configured to frictionally engage the inner clutch surface during operation of the decoupler assembly.

12. The decoupler assembly of claim 1, wherein the carrier includes a carrier member and an insert, the carrier member defining a recess into which the insert is received, the insert comprising a clutch stop against which an end face of the proximal end of the wrap spring is abutted.

13. The decoupler assembly of claim 12, wherein a retaining slot for receiving the proximal end of the wrap spring is formed in the carrier.

14. The decoupler assembly of claim 1, wherein the carrier defines a plurality of discrete arcuate trenches into which the arcuate springs are individually received.

15. The decoupler assembly of claim 1, wherein the hub comprises a plurality of radially extending tabs, each of the tabs having a leading edge that is abutted against a corresponding one of the arcuate springs.

16. The decoupler assembly of claim 15, wherein the radially extending tabs of the hub comprise a trailing edge, wherein a non-metallic bumper is coupled to the carrier and wherein contact between one of the trailing edges and the non-metallic bumper limits relative rotation between the carrier and the hub in a predetermined rotational direction.

17. The decoupler assembly of claim 16, wherein the non-metallic bumper is integrally formed with a portion of the carrier.

18. The decoupler assembly of claim 1, wherein the drive member is a pulley.

19. A decoupler assembly comprising:
a hub having a rotational axis, the hub comprising a plurality of radially extending tabs, each of the tabs having a leading edge and a trailing edge;
a drive member disposed about the hub for rotation about the rotational axis, the drive member having an inner clutch surface;
a clutch coupling the hub and the drive member, the clutch comprising a carrier, a rim, a plurality of arcuate compression springs, a wrap spring and a non-metallic bumper, the carrier being received between the hub and the drive member, the carrier including a carrier member and an insert, the carrier member defining a recess into which the insert is received, the insert comprising a clutch stop, the rim being fixed to the carrier and configured to abut an end of the wrap spring in at least two locations, each of the arcuate compression springs being mounted inside the carrier so as to be positioned axially along the rotational axis entirely between opposite axial ends of the wrap spring and engaged against an associated one of the leading edges of tabs of the hub, the wrap spring comprising a proximal end and a plurality of helical coils, the proximal end having an end face that is abutted against the clutch stop, the helical coils being engaged to the inner clutch surface of the drive member, the non-metallic bumper being coupled to the carrier and wherein contact between one of the trailing edges and the non-metallic bumper limits relative rotation between the carrier and the hub in a predetermined rotational direction; and
a lubricant disposed between the carrier and the arcuate compression springs.

20. A decoupler assembly comprising:
a hub having a rotational axis;
a drive member disposed about the hub for rotation about the rotational axis, the drive member having an inner clutch surface; and
a clutch coupling the hub and the drive member, the clutch comprising a carrier, a plurality of arcuate springs and a wrap spring, wherein the arcuate springs are disposed within the carrier so as to be positioned axially along the rotational axis entirely between opposite axial ends of the wrap spring, the arcuate springs deflecting in response to transmission of torque between the hub and the carrier when the torque has a magnitude that is within a predetermined range, the wrap spring being rotatably coupled to the carrier and having a plurality of coils that are engaged to the inner clutch surface;
wherein the decoupler assembly is characterized by at least one of the following:
the decoupler assembly includes a lubricant received between the carrier and the arcuate springs;
the clutch includes a clip that is coupled to the carrier, the clip abutting an axial end of the wrap spring such that rotary power is transmitted between the carrier and the wrap spring through an interface at which the clip and the axial end abut one another;
the carrier comprises first and second shell members that are fixedly coupled to one another via rivets, fasteners or combinations thereof;
the clutch includes a non-metallic bumper that limits rotation of the hub relative to the carrier; and
the carrier includes a rim element that is fixed to the carrier and which contacts the inner clutch surface during operation of the carrier.

\* \* \* \* \*